Patented July 3, 1951

2,558,923

UNITED STATES PATENT OFFICE 2,558,923

PROCESS OF PURIFYING ETHYLENE DIAMINE DI-ACETIC ACID

Frederick C. Bersworth, Verona, N. J.

No Drawing. Application May 12, 1948, Serial No. 26,727

1 Claim. (Cl. 260—534)

This invention relates to chemical processes and has for its object the provision of a method for producing ethylene diamine di-acetic acid.

Another object is to provide the product ethylene diamine di-acetic acid.

Other objects will be apparent as the invention is more fully hereinafter disclosed.

In accordance with these objects I have provided a method of producing ethylene diamine di-acetic acid which comprises condensing sodium cyanide and formaldehyde in approximately equal molar weight proportions in an aqueous solution of ethylene diamine containing sodium hydroxide sufficient to provide a pH of 8.5–10.5 while maintaining a reaction temperature of about 90° C. or within the range 85° to 95° C., and while excluding atmospheric gases from contact with the reaction solution in accordance with the general process described and claimed in my Patent No. 2,387,735 issued October 30, 1945, limiting the condensing reacting weights of the sodium-cyanide and formaldehyde added to the reaction solution to two molar reacting weights of each for each molar weight of ethylene diamine present in the reaction solution.

The amount of water present in the reaction solution is calculated to provide together with the water added during the reaction along with the sodium cyanide and formaldehyde a final solution containing about 20% dissolved solids which should consist substantially of the alkali metal salt (sodium) of ethylene diamine di-acetic acid and an excess of sodium hydroxide approximately sufficient to provide a pH in solution of from 8.5 to 10.5.

This alkaline reaction solution is filtered while hot and is allowed to cool to atmospheric temperatures and is then neutralized while agitated sufficient to maintain a uniform distribution of compounds therein with dilute solution of sulfuric acid until a pH of about 6.5 is obtained in the solution.

This acid pH solution is then subjected to distillation under reduced pressure to reduce the volume of the solution sufficiently to precipitate out of solution the major portion of the sodium sulfate present therein which precipitated sulfate is removed by filtration.

The filtrate is subjected to a succession of distillation steps under reduced pressure, and filtration steps to separate therefrom the major portion of the remaining sodium sulfate present in the filtrate during which practice the sodium sulfate recovered is tested for the presence of organic salts therein by known tests and any such organic salts found therein are recovered therefrom by digesting the precipitated sodium sulfate with a small volume of water sufficient to dissolve completely the organic salt and only slightly the sodium sulfate, which solution after filtering is returned to the filtrate under treatment for further distillation.

The removal of sodium sulfate by this practice is continued until the viscosity of the mother liquor filtrate becomes such as to make filtration difficult. The total amount of sodium sulfate collected is weighed and the percentage recovery determined by calculation against the known weight of sulfuric acid added originally to the reaction solution. The percent recovery of sodium sulfate by this practice should at least approximate 80%, and may be as high as 90% under best conditions.

The viscous mother liquor filtrate is then mixed thoroughly with an equal volume of ethyl alcohol and is allowed to stand for a sufficient time interval to permit the separation therefrom of the ethylene diamine di-acetic acid as a fine white crystal product which slowly collects in the bottom of the container. After decanting or otherwise separating the major portion of the supernatant alcoholic aqueous liquid from the deposited crystals, the crystals are redissolved in the smallest necessary amount of water again diluted with an equal volume of ethyl alcohol and permitted to recrystallize. One or more of such recrystallization treatments may be required to obtain finally a sodium sulfate-free final crystallized product.

The ethylene diamine di-acetic acid product obtained by the practice of the present invention is highly utilizable in the art of organic synthesis as an intermediate reaction product in the forming of a large number of amino compounds. In aqueous solutions the acid is reactive as a weak acid with basic compounds to form salts and the metallic salts of the acid are strong base-exchange agents with other metallic salts the basic ion of which is a stronger base than that neutralizing the carboxylic groups of the di-acetic acid. The di-metal salts of ethylene diamine di-acetic acid evidence unusual properties in the forming of complexes, particularly with poly-valent metal ions, some of which are ionic and others of which are non-ionic, some of which complexes appear to be of the chelate-type, others of the Werner-type and still others a combination chelate-Werner type of complex which have wide potential utility in the art of chemistry.

According to present chemical theories the ethylene diamine di-acetic acid has the structural formula:

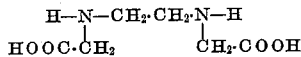

It is believed apparent that the invention may be widely varied without essential departure therefrom and all such modifications and departures are contemplated as may fall within the scope of the following claim:

What I claim is:

The method of treating an aqueous solution containing the sodium salt of ethylene diamine diacetic acid and sodium hydroxide to recover the diacetic acid therefrom which comprises acidifying the solution with sulfuric acid to a pH of 6.5, removing the water of solution to the extent producing precipitation of the major portion of the sodium sulfate without substantial precipitation of the diacetic acid, removing the precipitated sodium sulfate from the solution and adding ethyl alcohol to the solution in an amount precipitating the diacetic acid without substantial precipitation of the residual sodium sulfate present therein.

FREDERICK C. BERSWORTH.

REFERENCES CITED

The following references are of record in the file of this patent:

UNITED STATES PATENTS

| Number | Name | Date |
|---|---|---|
| 2,085,784 | Bottoms | July 6, 1937 |
| 2,163,594 | Engels et al. | June 27, 1939 |
| 2,209,299 | Schoeller et al. | June 23, 1940 |
| 2,334,163 | Kirk | Nov. 16, 1943 |
| 2,387,735 | Bersworth | Oct. 30, 1945 |
| 2,407,645 | Bersworth | Sept. 17, 1946 |
| 2,428,353 | Bersworth | Oct 7, 1947 |

FOREIGN PATENTS

| Number | Country | Date |
|---|---|---|
| 638,071 | Germany | Nov. 9, 1936 |
| 482,352 | Great Britain | Mar. 28, 1938 |
| 46,892 | Netherlands | Oct. 16, 1939 |

OTHER REFERENCES

Foreman, Biochem, J., vol. 8, pp. 463–466 (1914).

Fick et al., Chem. Abstracts, vol. 31, columns 1043–1044 (1937).